(12) United States Patent
Reyniers et al.

(10) Patent No.: US 9,221,668 B1
(45) Date of Patent: Dec. 29, 2015

(54) CONTAINER FILL PIPE

(71) Applicants: Lance A. Reyniers, Milwaukee, WI (US); Janet Buturla, Milwaukee, WI (US)

(72) Inventors: Lance A. Reyniers, Milwaukee, WI (US); Janet Buturla, Milwaukee, WI (US)

(*) Notice: Subject to any disclaimer, the term of this patent is extended or adjusted under 35 U.S.C. 154(b) by 0 days.

(21) Appl. No.: 14/801,879

(22) Filed: Jul. 17, 2015

(51) Int. Cl.
*B67D 7/42* (2010.01)
*B67D 7/02* (2010.01)
*A01K 63/00* (2006.01)

(52) U.S. Cl.
CPC ............ *B67D 7/42* (2013.01); *A01K 63/006* (2013.01); *B67D 7/0288* (2013.01)

(58) Field of Classification Search
CPC ........ B05B 15/06; B05B 15/061; B67D 7/42; B67D 7/421
USPC ............... 141/387–389, 392; 138/105–109; 239/532; 222/567
See application file for complete search history.

(56) References Cited

U.S. PATENT DOCUMENTS

| | | | |
|---|---|---|---|
| 1,826,829 A | 10/1931 | Scott | |
| 2,910,711 A * | 11/1959 | Mizelle | B05B 1/02 239/280 |
| 3,349,805 A * | 10/1967 | Fried | D06F 39/083 138/109 |
| D251,794 S * | 5/1979 | Smith | D23/238 |
| 4,151,864 A * | 5/1979 | Thurman | F16L 3/003 138/106 |
| 4,163,457 A * | 8/1979 | Rickel | D06F 39/083 137/216 |
| 4,303,348 A * | 12/1981 | O'Brien | A46B 7/04 15/236.04 |
| 4,756,043 A * | 7/1988 | Hazelet | E04D 13/0765 15/104.05 |
| 5,386,942 A * | 2/1995 | Dietle | E04D 13/0765 239/532 |
| 5,390,853 A * | 2/1995 | Ellul | B05B 15/06 239/282 |
| 5,695,654 A | 12/1997 | Schultz | |
| 6,178,984 B1 | 1/2001 | Amsellem | |
| 2003/0127855 A1 * | 7/2003 | Heverly | D06F 39/083 285/227 |
| 2011/0162584 A1 | 7/2011 | Sigmon et al. | |

* cited by examiner

*Primary Examiner* — Timothy L Maust
(74) *Attorney, Agent, or Firm* — Donald J. Ersler

(57) ABSTRACT

A container fill pipe preferably includes a hose end boss, a base tube, a tubular transition and a hook tube. The hose end boss extends from one end of the base tube and the tubular transition extends from the other end of the base tube. The hook tube extends from a distal end of the tubular transition. A thread counter bore is formed in the hose end boss. A through hole is formed through an end of the thread counter bore. A female garden hose thread is formed in the thread counter bore. The female garden hose thread is sized to threadably engage a male hose end of a garden hose. The tubular transition includes an inner entrance perimeter, which is greater than an inner exit perimeter. The hook tube includes an inner perimeter, which is substantially the same as the inner exit perimeter.

4 Claims, 4 Drawing Sheets

CONTAINER FILL PIPE

BACKGROUND OF THE INVENTION

1. Field of the Invention

The present invention relates generally to filling containers with water and more specifically to a container fill pipe, which allows the water container to be filled with water utilizing a garden hose.

2. Discussion of the Prior Art

It appears that the prior art does not disclose any devices for allowing a water container, such as an aquarium to be easily filled with water by placing a self-supporting device over a side wall thereof. U.S. Pat. No. 1,826,829 to Scott discloses a filling and draining device. U.S. Pat. No. 5,695,654 to Schultz discloses an apparatus and method for draining, cleaning, and filing an aquarium. U.S. Pat. No. 6,178,984 to Amsellem discloses a self-priming siphon, in particular for irrigation. Patent publication no. 2011/0162584 to Sigmon et al. discloses a system for filling and draining an aquarium.

Accordingly, there is a clearly felt need in the art for a container fill pipe, which allows a water container to be filled with water utilizing a garden hose and is self-supporting when placed on to a side wall of the water container.

SUMMARY OF THE INVENTION

The present invention provides a container fill pipe, which allows a water container to be filled with water utilizing a garden hose. The container fill pipe preferably includes a hose end boss, a base tube, a tubular transition and a hook tube. The hose end boss extends from one end of the base tube and the tubular transition extends from the other end of the base tube. The hook tube extends from a distal end of the tubular transition. A thread counter bore is formed in the hose end boss. A through hole is formed through an end of the thread counter bore. A female garden hose thread is preferably formed in the thread counter bore by a secondary operation. The female garden hose thread is sized to threadably engage a male hose end of a garden hose. A plurality of axial projections preferably extend from an outside perimeter of the hose end boss. The plurality of axial projections provide grip for threading the container fill pipe on to the male hose end of the garden hose. A ring groove is preferably formed between the hose end boss and the base tube for the manufacturing purpose of forming the female garden hose thread in the thread counter bore. The base tube includes an inner perimeter, which communicates with the through hole. The tubular transition includes an inner entrance perimeter, which is greater than an inner exit perimeter. The hook tube includes an inner perimeter, which is substantially the same as the inner exit perimeter. The container fill tube is preferably created by a plastic blow molding process.

Accordingly, it is an object of the present invention to provide a container fill pipe, which allows a water container to be filled with water utilizing a garden hose.

Finally, it is another object of the present invention to provide a container fill pipe, which is self-supporting when placed on to a side wall of a water container.

These and additional objects, advantages, features and benefits of the present invention will become apparent from the following specification.

DETAILED DESCRIPTION OF THE PREFERRED EMBODIMENTS

Figure 1:
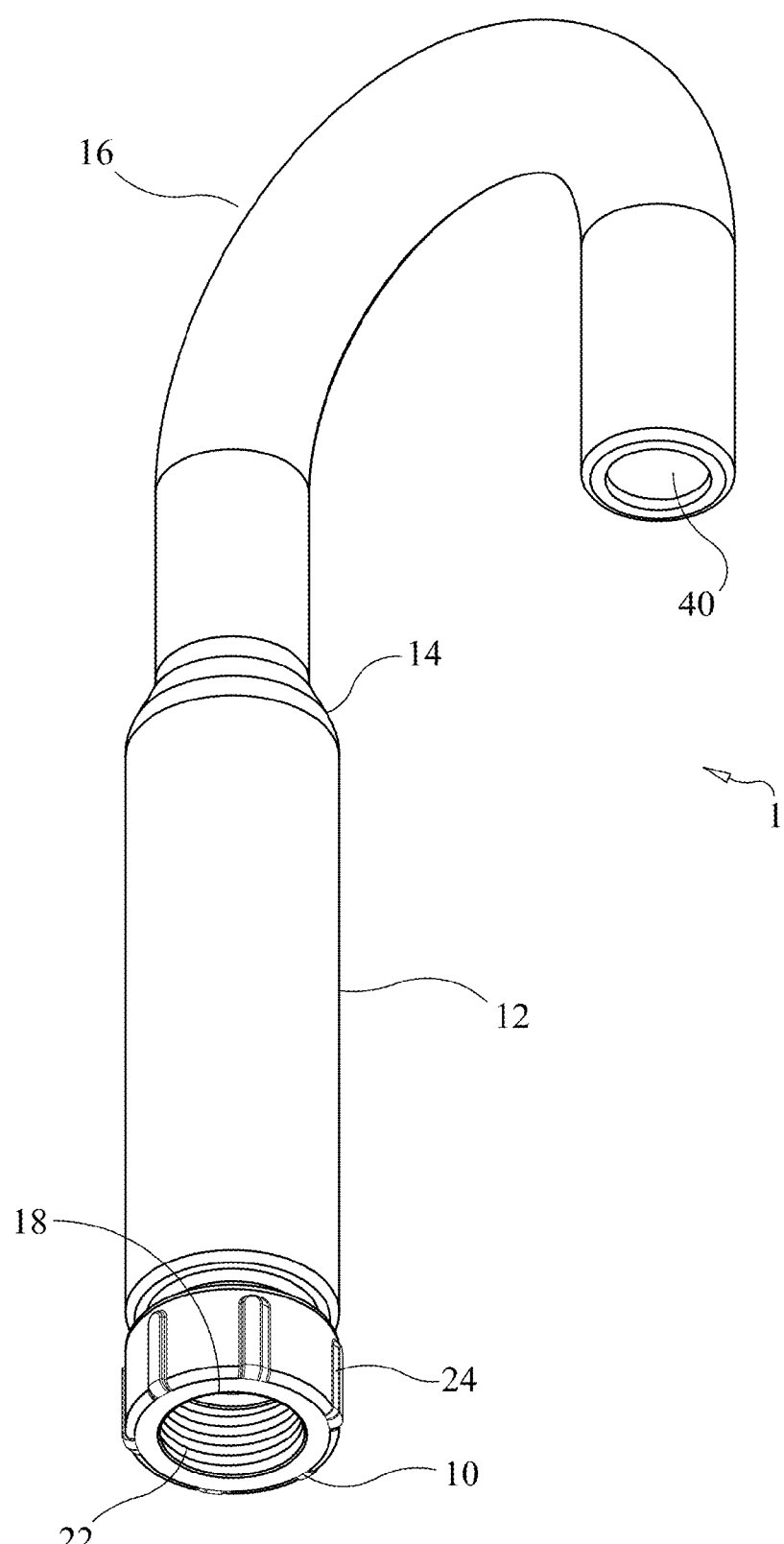
FIG. 1 is a perspective view of a container fill pipe in accordance with the present invention.
Figure 2:
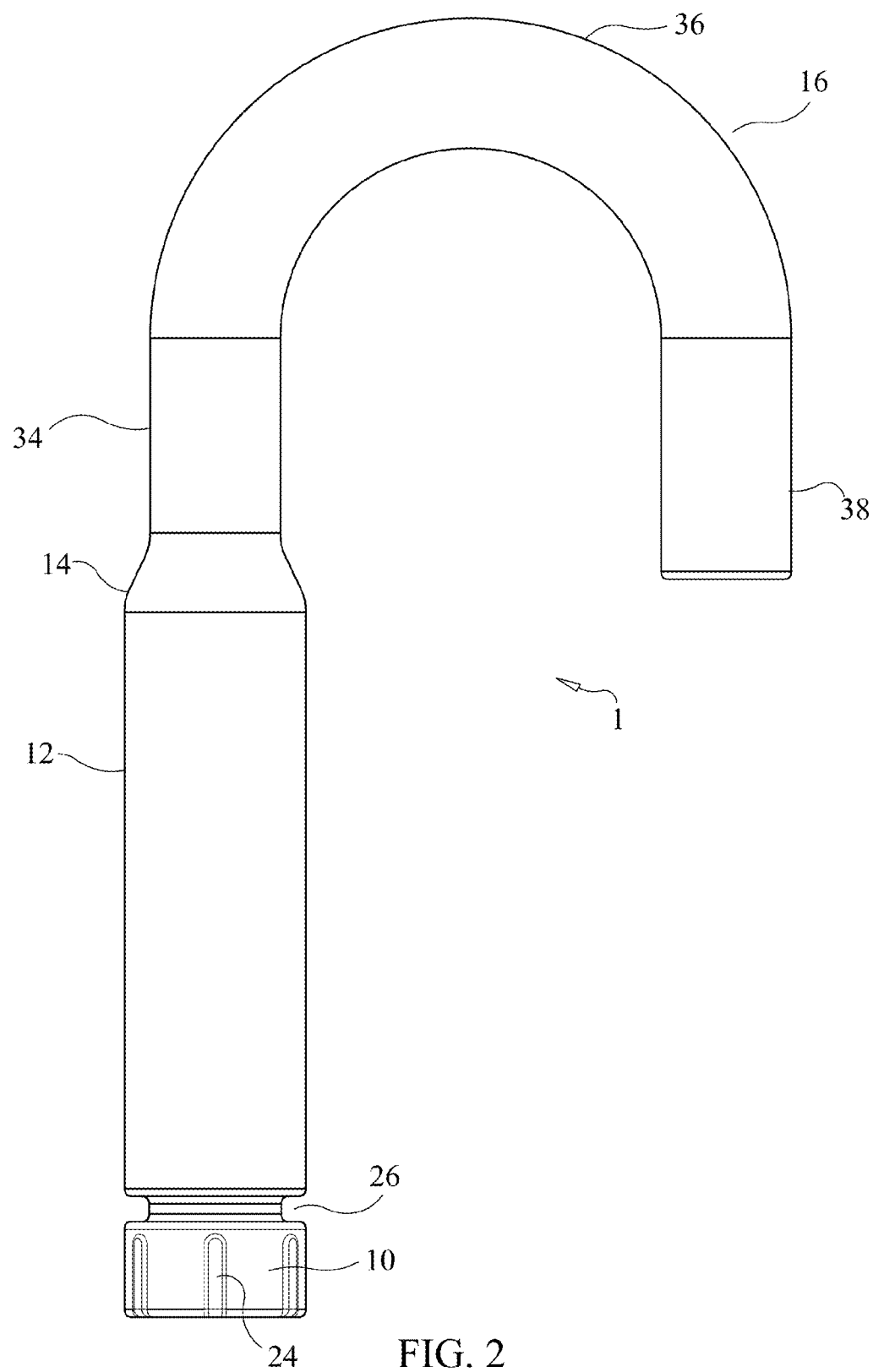
FIG. 2 is a side view of a container fill pipe in accordance with the present invention.
Figure 3:
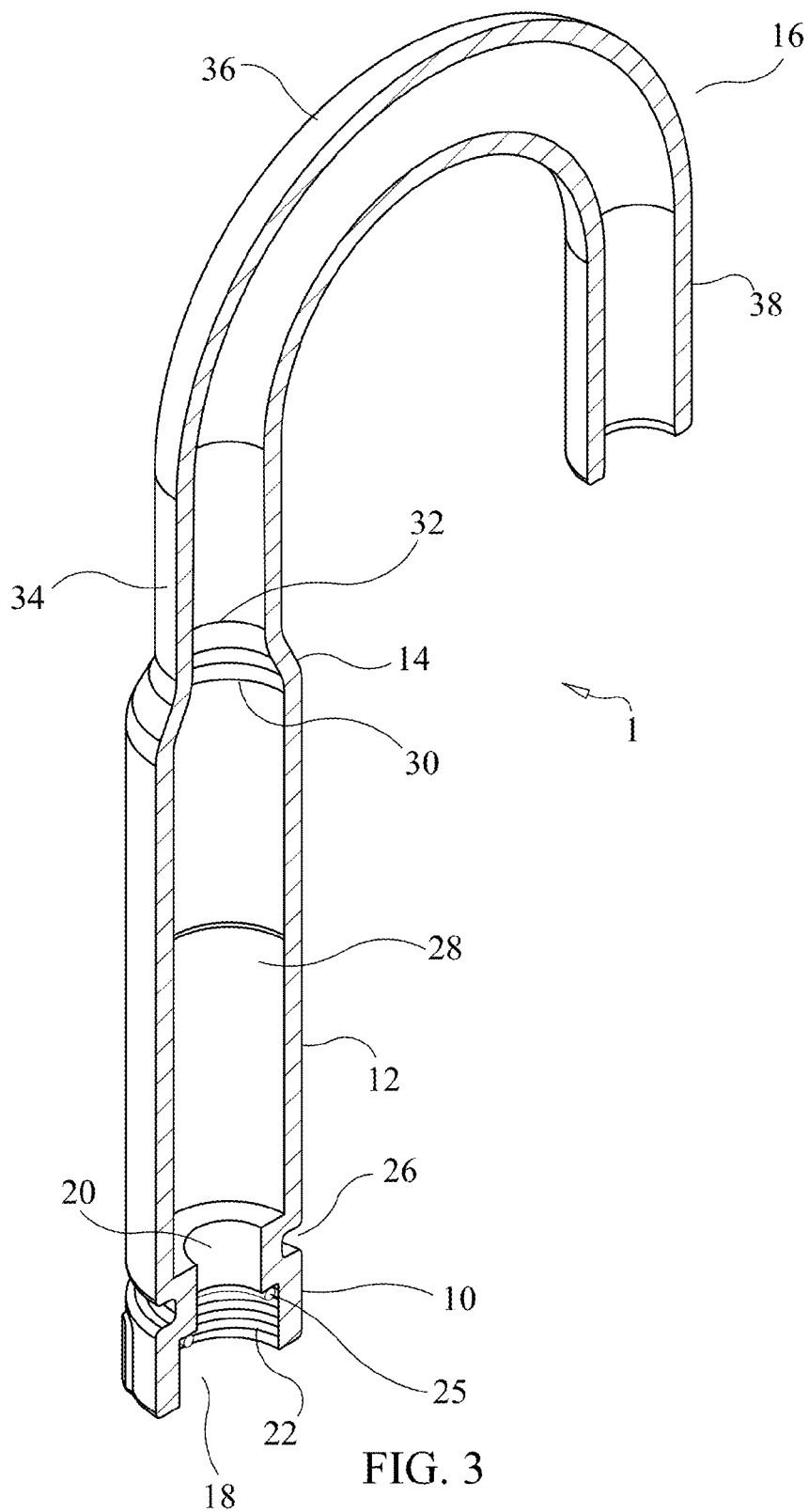
FIG. 3 is a perspective cross sectional view of a container fill pipe in accordance with the present invention.
Figure 4:
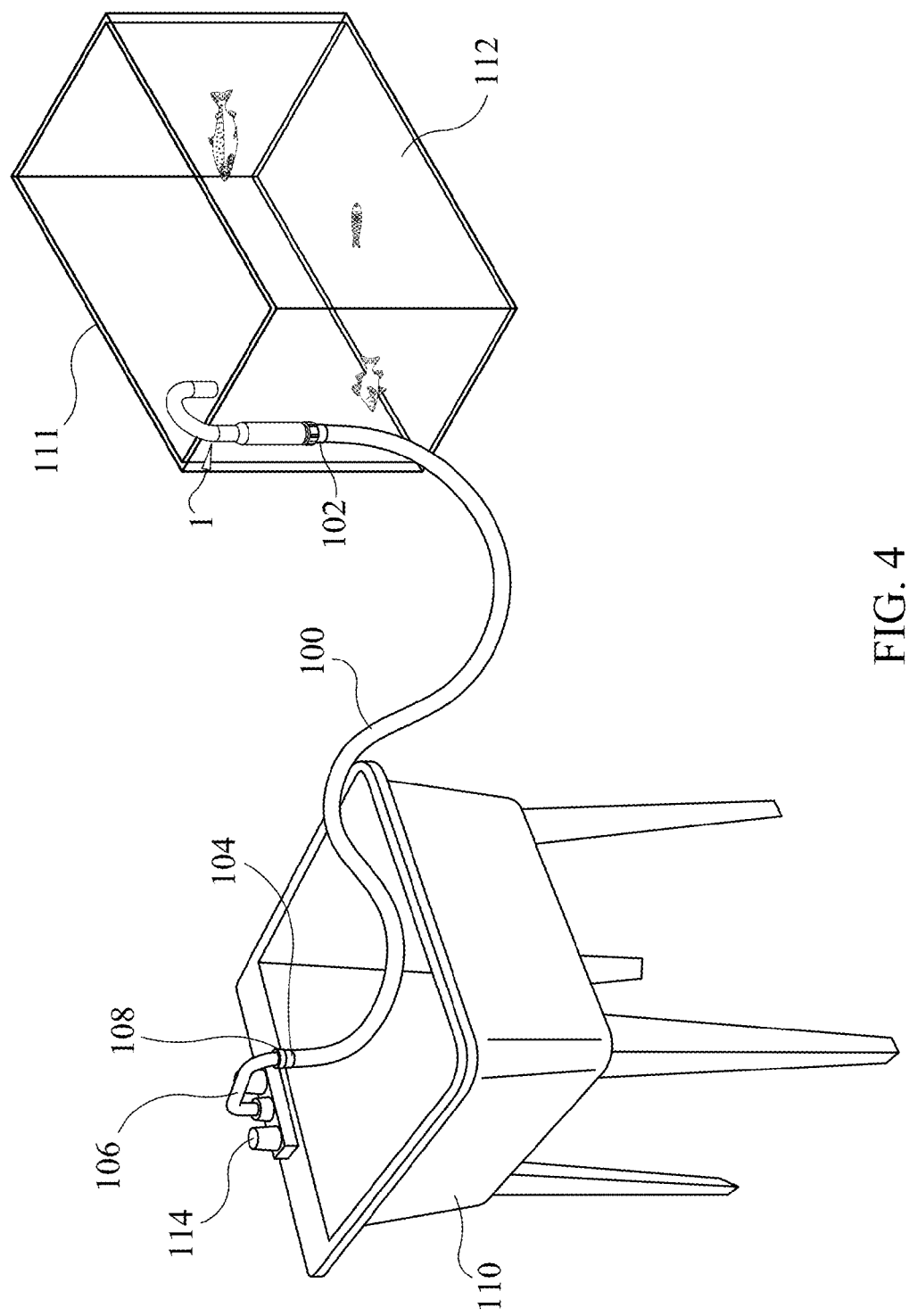
FIG. 4 is a perspective view of an aquarium before being filled with water utilizing the container fill pipe, a garden hose and a utility sink in accordance with the present invention.

With reference now to the drawings, and particularly to FIG. 1, there is shown a perspective view of a container fill pipe 1. With reference to FIGS. 2-3, the container fill pipe 1 preferably includes a hose end boss 10, a base tube 12, a tubular transition 14 and a hook tube 16. The hose end boss 10 extends from one end of the base tube 12 and the tubular transition 14 extends from the other end of the base tube 12. The hook tube 16 extends from a distal end of the tubular transition 14. A thread counter bore 18 is formed in the hose end boss 10. A through hole 20 is formed through an end of the thread counter bore 18. A female garden hose thread 22 is preferably formed in the thread counter bore 18 by a secondary operation. With reference to FIG. 4, the female garden hose thread 22 is sized to threadably engage a male hose end 102 of a garden hose 100. A sealing washer 25 is preferably inserted into an end of the thread counter bore 18 to seal the male hose end 102 to thread counter bore 18. A plurality of axial projections 24 preferably extend from an outside perimeter of the hose end boss 10. The plurality of axial projections 24 are parallel with an axis of an inner perimeter of the container fill pipe 1. However, a plurality of flats may also be formed on an outer perimeter of the hose end boss 10. The plurality of axial projections 24 provide grip for threading the container fill pipe 1 on to the male hose end 102 of the garden hose 100.

A ring groove 26 is preferably formed between the hose end boss 10 and the base tube 12 for the manufacturing purpose of forming the female garden hose thread 22 in the hose end boss 10. The base tube includes an inner perimeter 28, which communicates with the through hole 20. The tubular transition 14 includes an inner entrance perimeter 30, which is greater than an inner exit perimeter 32. The transition tube 14 includes a smooth transition between the inner entrance perimeter 30 and the exit perimeter 32. The hook tube 16 preferably includes an entrance tube 34, a semi-circular tube 36 and an exit tube 38. The entrance tube 34 extends from one end of the semi-circular tube 36 and the exit tube 38 extends from an opposing end of the semi-circular tube 36. The entrance tube 34, the semi-circular tube 36 and the exit tube 38 preferably include the same hook inner perimeter 40. The hook inner perimeter 40 is preferably is substantially the same as the inner exit perimeter 32. The container fill tube 1 is preferably created from a single piece of plastic material in a blow molding process. The plastic material does not contain Bisphenol A (BPA), arsenic or lead. Otherwise, it would kill living things in an aquarium or the like.

In use, a female end 104 of the garden hose 100 is threaded on to a threaded faucet end 108 of a faucet 106. The faucet 106 could be from a utility sink 110 or extending from an outside of a house. The hose end boss 10 is threaded on to the male hose end 102 of the garden hose 100. The container fill tube 1 is hooked over a side wall 112 of an aquarium 111 or other water container. A water valve 114 is opened to allow water to flow through the faucet 108 and the container fill tube 1 into the aquarium 111.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A container fill tube for hanging on a side wall of an open top tank of liquid comprising:
   a hose end boss having a counter bore formed in an end thereof, a hose thread is formed in said counter bore, said hose thread is threadably engagable with a male hose end thread, said hose end boss and said container fill tube are formed from a single piece of nonferrous material;
   a base tube includes a base inner perimeter, said base tube extends from an end of said hose end boss, said base inner perimeter communicates with said counter bore;
   a through hole is formed through an end of said thread counter bore into said base inner perimeter, said through hole includes a diameter that less than a diameter of said base inner perimeter and said thread counter bore;
   a ring groove is formed in an outer perimeter of said container fill tube between said hose end boss and said base tube, wherein said ring groove is used during a manufacturing process to create said hose thread;
   a hook tube includes a hook inner perimeter, said hook tube extends from a distal end of said base tube, said hook inner perimeter communicates with said base inner perimeter, said hook tube includes a substantially semi-circular shape; and
   a tubular transition having an inner entrance perimeter which is greater than an inner exit perimeter, said base tube extends from said inner entrance perimeter, said hook tube extends from said inner exit perimeter, wherein a bottom of an outside perimeter of said hook tube is hung on a top edge of the side wall of the open top tank of water to fill the open top tank with water.

2. The container fill tube of claim 1, further comprising:
   a sealing washer is placed in an end of said counter bore.

3. The container fill tube of claim 1 wherein:
   said container fill tube is fabricated from a single piece of plastic material by blow molding.

4. The container fill tube of claim 1 wherein:
   a plurality of axial projections extend from an outer perimeter of said hose end boss.

* * * * *